US008751782B2

(12) United States Patent
Khosravi et al.

(10) Patent No.: US 8,751,782 B2
(45) Date of Patent: Jun. 10, 2014

(54) SECURE LOCAL BOOT USING THIRD PARTY DATA STORE (3PDS) BASED ISO IMAGE

(75) Inventors: Hormuzd M. Khosravi, Portland, OR (US); Divya Naidu Kolar Sundar, Beaverton, OR (US); David M. Durham, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 533 days.

(21) Appl. No.: 12/970,698

(22) Filed: Dec. 16, 2010

(65) Prior Publication Data

US 2012/0159137 A1 Jun. 21, 2012

(51) Int. Cl.
| | | |
|---|---|---|
| G06F 9/00 | (2006.01) | |
| G06F 15/177 | (2006.01) | |
| G06F 11/30 | (2006.01) | |
| G06F 12/14 | (2006.01) | |
| G06F 7/04 | (2006.01) | |
| G06F 17/30 | (2006.01) | |

(52) U.S. Cl.
USPC .................. 713/2; 713/189; 713/193; 726/2

(58) Field of Classification Search
CPC ............................. G06F 21/575; G06F 21/78

USPC .................................................. 713/1, 2, 150
See application file for complete search history.

(56) References Cited

U.S. PATENT DOCUMENTS

| | | | | |
|---|---|---|---|---|
| 2004/0117610 | A1* | 6/2004 | Hensley | 713/2 |
| 2006/0149860 | A1* | 7/2006 | Diamant | 710/15 |
| 2008/0046546 | A1* | 2/2008 | Parmar et al. | 709/220 |
| 2008/0109903 | A1* | 5/2008 | Werner et al. | 726/22 |
| 2009/0006859 | A1* | 1/2009 | Zimmer et al. | 713/186 |
| 2009/0327678 | A1* | 12/2009 | Dutton et al. | 713/2 |
| 2010/0306519 | A1* | 12/2010 | Buonpane et al. | 713/2 |
| 2011/0154023 | A1* | 6/2011 | Smith et al. | 713/155 |
| 2012/0042376 | A1* | 2/2012 | Dolgunov et al. | 726/19 |

* cited by examiner

*Primary Examiner* — Kim Huynh
*Assistant Examiner* — Brandon Kinsey
(74) *Attorney, Agent, or Firm* — Blakely, Sokoloff, Taylor & Zafman LLP

(57) ABSTRACT

In some embodiments, the invention involves a method and apparatus for secure/authenticated local boot of a host operating system on a computing platform using active management technology (AMT) with a third party data store (3PDS)-based ISO firmware image. A portion of non-volatile memory is hardware secured against access by the host processor and OS, and accessible only to the AMT. The AMT comprises an AT/ATAPI protocol emulator to access an ISO boot image from secured memory, while appearing to the host processor as a communication with an AT/ATAPI device. Other embodiments are described and claimed.

15 Claims, 6 Drawing Sheets

SECURE LOCAL BOOT USING THIRD PARTY DATA STORE (3PDS) BASED ISO IMAGE

FIELD OF THE INVENTION

An embodiment of the present invention relates generally to booting of a computing system and, more specifically, to a method and apparatus for secure/authenticated local boot of a host operating system on a computing platform using active management technology (AMT) with a third party data store (3PDS)-based ISO firmware image.

BACKGROUND INFORMATION

Various mechanisms exist for network booting of a computing platform. Existing systems may use a pre-boot execution environment (PXE) boot to retrieve a boot image from a remote network drive. The boot image is typically stored in a standard format defined by the International Standard Organization (ISO), and will be herein referred to as an ISO boot image, ISO firmware image, or simply ISO image. Network booting allows the platform to boot from an image stored securely in a remote location, controlled by an IT organization or trusted third party. However, when the platform has no network connectivity, the host operating may not be able to boot if the boot target parameters require remote booting.

Local booting of an operating system from a hard disk drive can be problematic because the image may be open to malware, residing on storage that is accessible to the OS or application software.

BRIEF DESCRIPTION OF THE DRAWINGS

The features and advantages of the present invention will become apparent from the following detailed description of the present invention in which.

DETAILED DESCRIPTION

Figure 1:
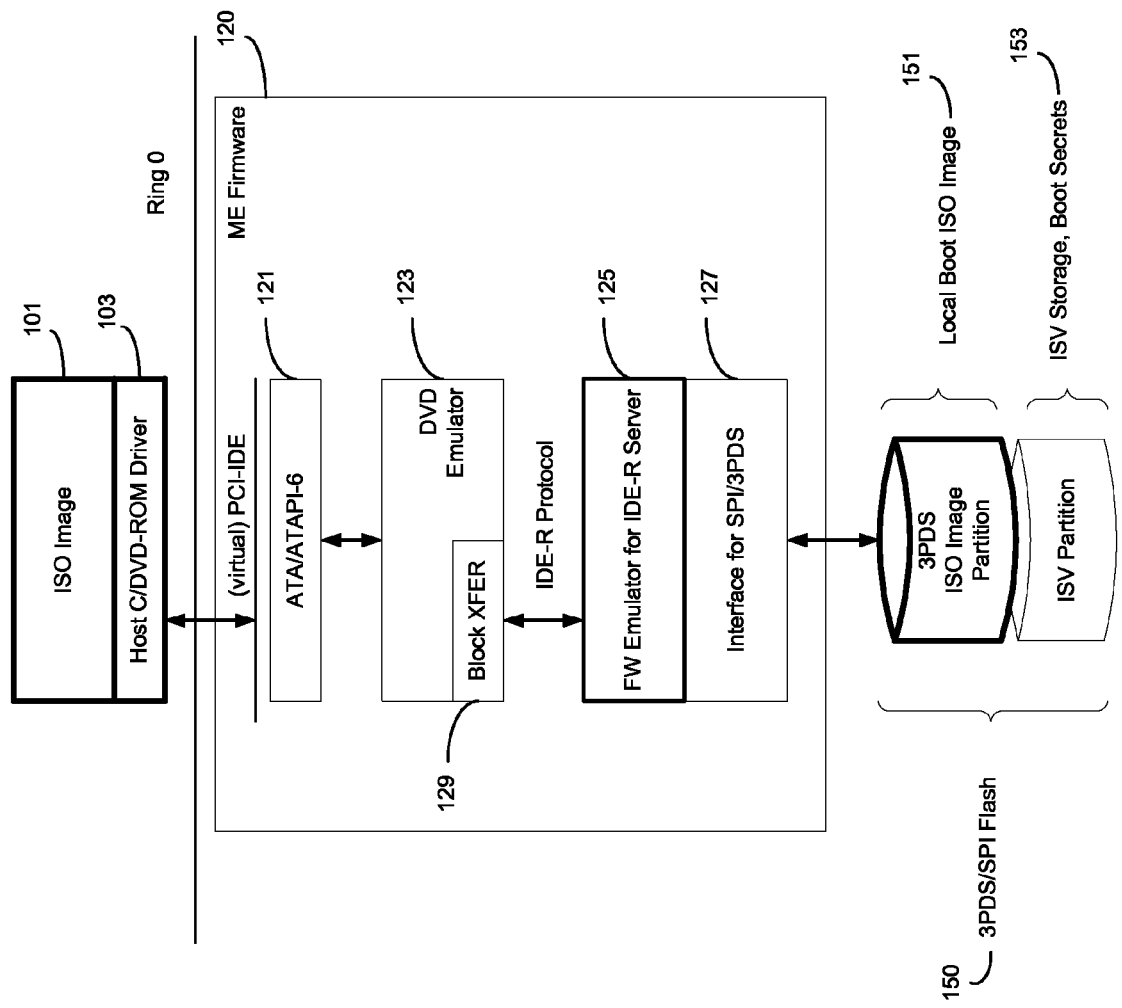
FIG. 1 is a block diagram illustrating an example architecture using cached IDE-redirect, according to an embodiment of the invention.

An embodiment of the present invention is a system and method relating to secure/authenticated local boot of computing platform using Active Management Technology (AMT) with a third party data store (3PDS)-based ISO firmware image. An embodiment uses a "cached" IDE-Redirect protocol and may be implemented on a system having AMT such as a Centrino® platform with vPro™ available from Intel Corporation. Embodiments of the invention may result in both security and manageability aspects for the platform. Security independent software vendors (ISVs) may see advantages in a platform that use a secure storage for a "clean" or "whitelisted" image to boot the host processor on the platform. This secure storage may reside in a third party data store (3PDS) in non-volatile memory, typically flash memory, and co-located with AMT code. Since the AMT processor has its own out-of-band connectivity, independent of the host processor, authorized third parties may update the boot image and related data in a secure area of flash memory accessible by the AMT manageability engine (ME) and inaccessible to the host processor. Furthermore, AMT code runs independently of the power state of the host processor, allowing out-of-band connectivity and updates to the 3PDS ISO image even when the host processor system is asleep or off. It will be understood that the term manageability engine (ME) used herein, typically refers to the actual controller, and active management technology (AMT) typically refers to the firmware code running on the ME to provide functionality as described herein.

A pre-boot execution environment (PXE)/operating system (OS), such as available from a Streaming ISV, such as Citrix/Ardence, have scalability problems because the PXE code doesn't scale beyond subnets. PXE is an environment to boot computers using a network interface independently of data storage devices (like hard disks) or installed operating systems. PXE uses Layer 2 broadcasts (BOOTP) in order to reach a server which requires substantial changes in network configuration. PXE protocol requires duplicate servers to reduce collision domains and/or complex network configurations. Thus, a remote boot using an ME with AMT firmware provides a more secure solution to remote booting, but existing systems do not allow for the ME to boot the host processor from a local storage location under AMT control.

An embodiment of the invention would embed this bootstrap code in protected persistent flash memory controlled by AMT, for example, inside a 3PDS, rather than rely only on a network connection. This enables the platform to boot even when disconnected from the network boot path. However, existing systems having an AMT processor, such as vPro™, have no defined means to perform local IDE-Redirect boot using ISO image residing in a 3PDS.

Embodiments of the invention provide a more secure boot based on boot vector authentication as opposed to use of MAC address (which may be easily spoofed). It should be noted that PXE is not used by DoD or other security conscious organizations. In contrast, a 3PDS may be securely updated via the AMT network stack using the industry standard transport layer security (TLS) protocol with bilateral authentication of the network communication and high strength AES data encryption. Also, because the boot image is stored in a secure location unavailable to the host OS or application software running on the host processor, the recovery OS/mini-OS cannot be easily wiped or corrupted.

Embodiments of the invention may utilize an ISO image residing in a secure 3PDS via a local IDE-redirect boot. The ISO image may be pre-populated by an authorized vendor or third party, or populated using the out-of-band (OOB) communication capabilities of the AMT. It will be understood that a wide variety of secure methods may be used to authenticate an ISO image before the AMT accepts the image for writing into the 3PDS. Further, the OOB communication channel typically uses an authenticated transport layer security (TLS) channel. A system administrator will have the credentials to put an authorized ISO image locally onto the platform into the 3PDS. The AMT may then check the signature of the image to ensure it has not been corrupted. A secure/authenticated method for the local IDE-redirect is defined herein to ensure platform boot secrets are used. Methods described herein are not subject to being circumvented by malware.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

For purposes of explanation, specific configurations and details are set forth in order to provide a thorough understanding of the present invention. However, it will be apparent to one of ordinary skill in the art that embodiments of the present invention may be practiced without the specific details presented herein. Furthermore, well-known features may be omitted or simplified in order not to obscure the present invention. Various examples may be given throughout this description. These are merely descriptions of specific embodiments of the invention. The scope of the invention is not limited to the examples given.

An embodiment of the invention uses a cached IDE-Redirect protocol/ISO image inside a 3PDS as a way to securely boot the host processor on a platform, locally via a signed image, and attest to the fact that the expected image was indeed used to boot the platform to a remote entity. The OS boot-strap image/ISO image is embedded inside a 3PDS which is designed to be used by ISVs as a secure storage place in the platform. However, there is no standard in existing systems to use this secure storage area for an ISO boot image. Further, embodiments of the invention provide the ability for local boot of secure ISO image without network dependencies.

FIG. 1 is a block diagram illustrating an example architecture using cached IDE-redirect, according to an embodiment of the invention. Architectural components may include the following:

ATA/ATAPI: This is the standard ATA (AT attachment) interface defining features for hard disk transfer modes.

DVD emulator: Firmware (FW) logic to emulate a DVD/IDE interface via standard PCIe device space/registers.

Block transfer/IDE-R protocol: An IDE-Redirect protocol may be implemented in a manageability engine (ME) AMT firmware, for instance, as defined by the Intel® AMT (iAMT) architecture, to transfer data blocks to a remote IDE device.

FW emulator for IDE-R Server: This component may be implemented in AMT firmware code to emulate a remote IDE-Redirect server locally, and communicates to a 3PDS/SPI flash memory to read/write blocks to a local copy of an ISO boot image.

Referring now to FIG. 1, a boot image in ISO format 101 is required to boot the system. The host BIOS platform has a CD/DVD-ROM driver 103. This CD/DVD-ROM driver is one typically deployed with BIOS in order to boot from a CD/DVD. In an embodiment, the host platform is configured to boot from a network drive using AMT. The CD/DVD driver is virtualized within AMT to capture boot commands that are standardized to communicate with a CD/DVD. When the network is unavailable, the host platform is configured to retrieve a secure boot image 151 from a third party data store (3PDS) 150 through the virtualized driver.

The ME/AMT firmware 120 is firmware for a second processor on the platform. The second processor is typically an embedded processor with an independent coupling to a power supply and out-of-band network interface connection, to be described more fully in conjunction with FIG. 6. ME/AMT firmware 120 may comprise a virtual PCI-IDE interface 121 coupled with a DVD emulator 123. The PCI-IDE interface may comply with the ATA/ATAPI-6 standard, or similar standard, as would typically be used for communication with a CD/DVD-ROM device. Thus, the host processor uses ATA/ATAPI standard commands as if it were communicating with an ATA/ATAPI device. The ME intercepts these commands and AMT uses a DVD emulator to convert the access protocol to be used with a local flash device 150, instead. The DVD emulator may include block transfer logic 129 for reading/writing blocks from/to a local flash drive 150. It appears to the invoking routine on the host that the boot image resides on a CD/DVD-ROM drive, and retrieval commands are consistent with usual commands to retrieve the boot image from this type of drive. However, the ME/AMT firmware 120 intercepts this communication and emulates the CD/DVD-ROM command, but instead actually performs block transfer 129 from a 3PDS 150.

The boot device may be set during platform setup to point to the virtualized AT/ATAPI device. However, the device selected is actually the ME, which only appears to the BIOS as an AT/ATPAPI device. Thus, any communication to this device is actually sent to the ME/AMT for further processing by the DVD emulator 123.

The protocol for communication with the 3PDS may be referred to as an IDE-R (IDE-redirect) protocol, because apparent communication with a CD/DVD-ROM is redirected to actual communication with the 3PDS. A firmware emulator 125 for an IDE-R server may be coupled to an interface 127 for SPI/3PDS communication. The FW emulator 125 coupled to the SPI/3PDS interface 127 enables an ISO image 151 to be retrieved from the 3PDS 150, also known as the IDE-R server, transparently. An ISV partition 153 may also reside on the 3PDS 150 to securely store boot credentials or disk encryption credential, signatures and other data that may be needed by boot, or other code, provided by the ISV. These credentials may also be referred to as "secrets" in the description herein, for simplicity. The ISV partition 153 is also inaccessible to the host OS or host application software. Since the 3PDS flash portions 150 are permanently hardware (chipset) sequestered to allow only the AMT firmware access to the ISO image partition 151 and boot secret partition 153, all accesses to the boot secrets in the ISV partition 153 must be brokered through the AMT firmware.

Existing systems may include an ME/AMT using an IDE-R protocol to boot from a remote network location. The AMT firmware may expose a remote server's storage as if it were a local device on the platform. This technique may be used to boot an operating system other than the locally stored OS or fix the platform for manageability purposes. However, there is no existing method to boot a local image from AMT protected flash, using the IDE-R technique. Thus, existing systems may require an active network connection to boot the platform.

In an embodiment of the invention, the code 153 residing in the 3PDS may comprise a clean operating system to recover from a damaged OS, or launch security software to scan the OS for viruses, or to provide protection services before the OS is launched, or to launch a virtual machine manager/hypervisor which may persist in host memory and provide additional services under the host operating system. It will be apparent to those of skill in the art, that a variety of security and manageability applications may reside in the 3PDS.

Figure 2:
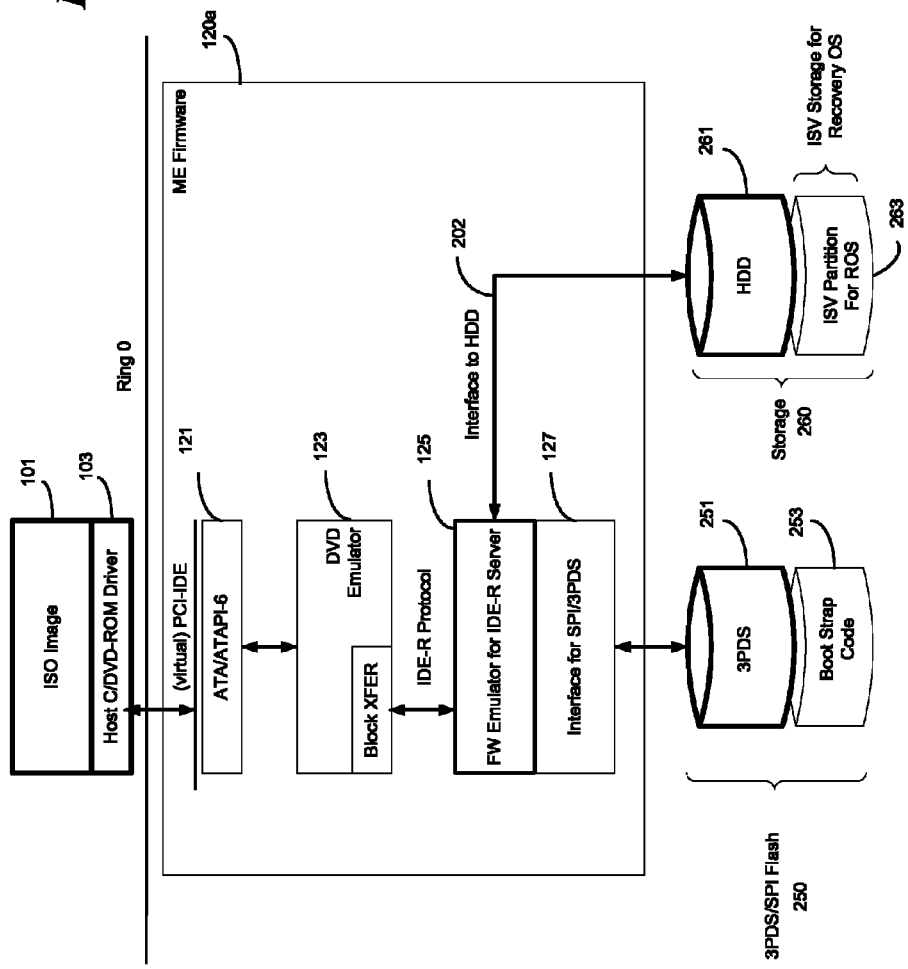
FIG. 2 illustrates an embodiment of the invention using only boot strap code on the 3PDS, instead of the entire boot image.

FIG. 2 illustrates an embodiment of the invention using only boot strap code on the 3PDS, instead of the entire boot image. In this embodiment, boot strap code is stored 253 on flash memory 250, and a 3PDS portion 251 may be use for secure third party information and secrets. The boot image is stored on a hard disk drive 260 in an area dedicated for ISV partition for a recovery OS 263. The remaining portion 261 of the hard drive 260 may be used as any other hard disk drive device coupled to the platform.

The boot strap code 253 utilizes the recovery boot image 263 in order to power up the platform with the ISW boot image. This method may be used when the 3PDS portion of the flash is not large enough to hold the entire boot image. Components of this embodiment are similar to the embodiment shown in FIG. 1, with some additions.

The ME/AMT firmware 120a includes an interface to the hard disk drive 202 so that the AMT can access sectors on the hard disk drive 260. The ISV partition for the recovery OS 263 may be utilized by a third party ISV to store the bootable image. Unlike boot images stored on a hard drive for existing systems, the bootable image may start at a sector which is not sector 0, and has a master boot record (MBR) at a non-sector 0 location. The firmware emulator for the IDE-R server 125, accesses the ISV partition 263 at the non-0 sector location, but makes it appear as a sector 0 MBR to the host processor during boot.

AMT also monitors the boot phases of the host processor. This allows AMT to know when it can securely present the contents of 3PDS to the host system for boot, and allowing data access versus closing access to 3PDS because another (non-AMT provided) image was already used to boot the system.

The AMT firmware distinguishes between the IDE-R device being a boot device and an IDE-R device being mounted by an already booted OS. For instance, if there is a secret key stored in the AMT secure storage provisioned out-of-band (OOB) by an IT console, embodiments of the invention protect the key from malware by prohibiting the OS or malware process from accessing the secret key by merely mounting the IDE-R device using AMT protected local storage. The AMT only exposes the IDE-R boot device partition during boot time. Once the OS has booted, the device will not be exposed by the AMT. Instead, after boot, the AMT removes visibility of the IDE registers and the PCIe space. The AMT is notified when the system is booted and has information regarding the power state of the system/platform such that the AMT may exactly determine when the host system is booting off the reset vector.

Figure 3:
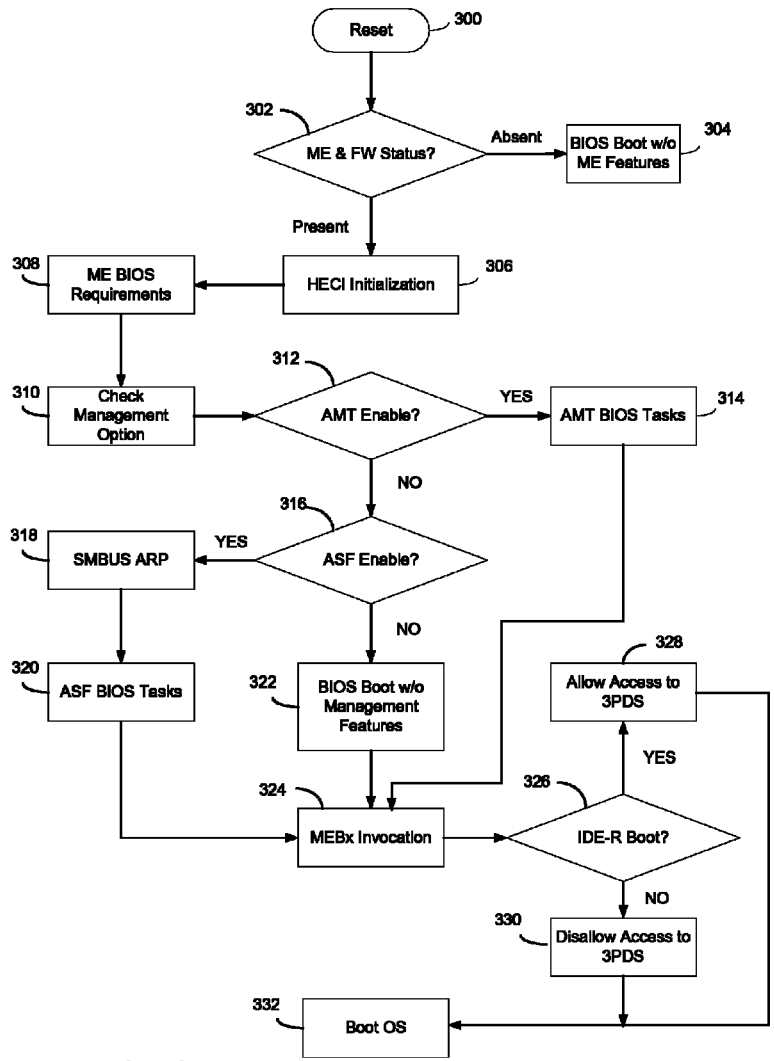
FIG. 3 illustrates a flow diagram of a method for using the IDE-R server, securely, according to an embodiment of the invention.

Now referring to FIG. 3, there is shown a flow diagram illustrating a method for using the IDE-R server, securely, according to an embodiment of the invention. First, the system is reset or powered up, in block 300. An embodiment of the invention provides a new boot vector for the platform. A determination is made as to whether the ME and AMT firmware status is present in the platform, in block 302. If the ME is not available, or not provisioned to access the local IDE-R server, then the BIOS boots the system without the ME/AMT features, in block 304. When the ME/AMT is not set as present, the secure storage (150, 250) cannot be accessed at all, because only the host processor will be booted (if possible), and the host OS and applications have no access to the AMT protected partition of flash memory.

If the AMT features are present, the host embedded controller interface (HECI) is initialized in block 306. The ME BIOS checks the ME BIOS requirements, in block 308, to ensure that the ME image stored in the secure area is what is expected. The management options are then checked in block 310. At this point the ME has been booted, but may not be enabled for use. A decision is made as to whether the AMT is enabled, in block 312. The AMT may be enabled remotely or locally. If so, then the AMT proceeds to commence with the AMT BIOS boot tasks, in block 314. MEBx invocation then proceeds in block 324. If the boot target is a relocation device (IDE-R boot), as determined in block 326, then the 3PDS is made available for booting in block 328, and the DVD emulator will emulate the AT/ATAPI protocol commands sent to perform an AMT boot. The boot secrets and credentials stored in the 3PDS portion will then be made available during the host OS boot of the 3PDS OS image. The OS is then booted in block 332.

If the IDE-R boot is not selected, as determined in block 326, then access to the 3PDS is disallowed in block 330 and the OS is booted from the usual local or remote network location via the BIOS image run by the host processor, in block 332.

If the AMT boot is not selected, as determined in block 312, then a determination is made as to whether the alert standard format ASF is enabled, in block 316. ASF is a standard that the DMTS (desktop/distributed management task force) has defined for protocols to communicate through the BIOS and SMBUS for sending commands to different components of the platform. If ASF is not enabled, then the BIOS boots without the management features in block 322, and processing continues with MEBx invocation in block 324. A determination is made as to whether IDE-R is enabled in block 326, and processing continues as discussed above. It will be noted that the 3PDS image is not accessible to the host processor when AMT did not provide the boot image for the host processor.

If the ASF is enabled, as determined in block 316, then the system management bus (SMBUS) address resolution protocol (ARP) is performed in block 318. ASF BIOS tasks are then performed in block 320, and processing continues at block 324, as discussed above.

Figure 4:
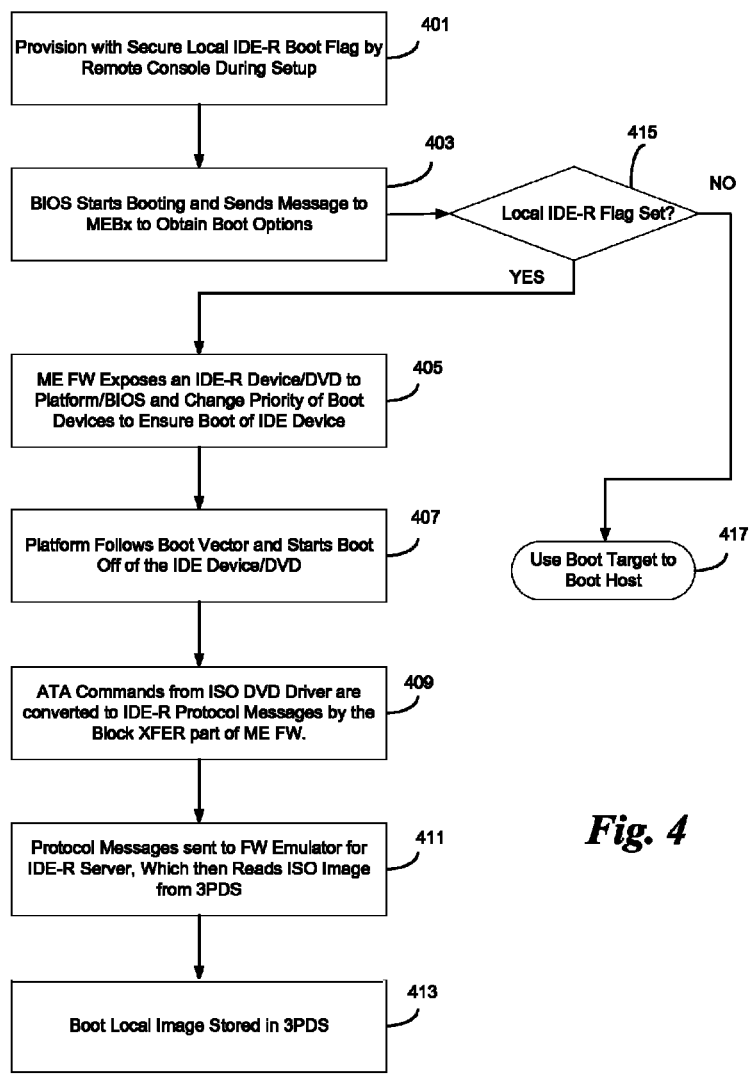
FIG. 4 is a flow diagram illustrating a method for using IDE-R to boot from a local 3PDS drive, according to an embodiment of the invention.

Referring to FIG. 4, there is shown a flow diagram illustrating a method for using IDE-R to boot from a local 3PDS drive, according to an embodiment of the invention. FIG. 4 generally provides more detail to the method corresponding to the embodiment shown in FIG. 1. First, the secure local IDE-R boot flag may be provisioned by a remote console during setup of the platform, in block 401. The BIOS starts booting and sends a message to the ME boot extension (MEBx) to obtain the boot options, in block 403. It is determined whether the local IDE-R flag is set, in block 415. If the flag is set, then the platform is provisioned to boot from a local IDE-R drive and processing continues at block 405.

The ME/AMT firmware exposes an IDE-R device/DVD to the platform/BIOS and changes the priority of boot devices to ensure that the IDE device is the primary boot device, in block 405. The platform follows the boot vector and starts to boot from the IDE device/DVD, in block 407. ATA commands from ISO DVD Driver are converted to IDE-R protocol messages by the block transfer part (129) of ME/AMT firmware (120), in block 409.

Protocol messages are sent to the firmware emulator for IDE-R server (125), which then reads ISO image from 3PDS, in block 411. The local ISO image stored in the 3PDS is then booted, in block 413.

If the local IDE-R flag was not set, then the BIOS utilizes the usual boot target to boot the host processor, in block 417. This may be an actual boot from remote network location, hard drive, solid state drive, CD/DVD, or the like, depending on the BIOS setup parameters, network connectivity, and which drives in the boot setup priority order are actually bootable drives.

Figure 5:
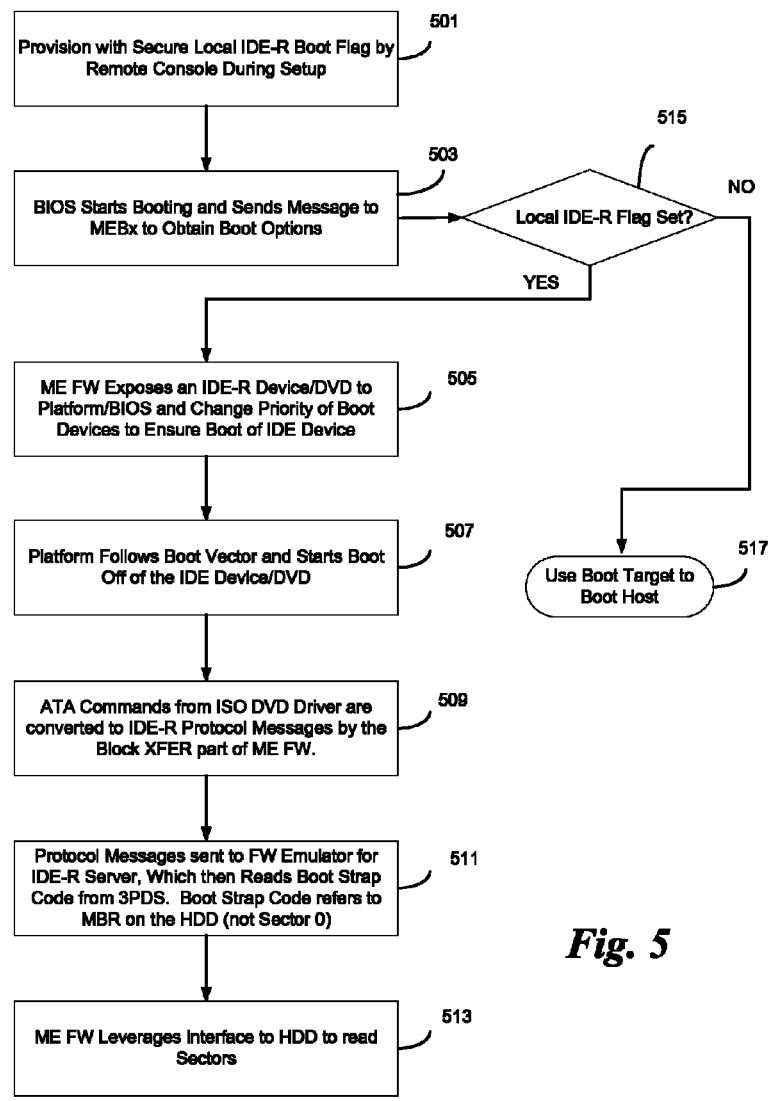
FIG. 5 is a flow diagram illustrating a method for using IDE-R to boot from a secure area of a local hard disk drive using boot strap code in a 3PDS, according to an embodiment of the invention.

Referring to FIG. 5, there is shown a flow diagram illustrating a method for using IDE-R to boot from a local hard disk drive using boot strap code in a 3PDS, according to an embodiment of the invention. FIG. 5 generally provides more detail to the embodiment corresponding to FIG. 2. First, the secure local IDE-R boot flag is provisioned by a remote console during setup of the platform, in block 501. The BIOS starts booting and sends a message to the ME boot extension (MEBx) to obtain the boot options, in block 503. It is determined whether the local IDE-R flag is set, in block 515. If the flag is set, then the platform is provisioned to boot from a local IDE-R drive and processing continues at block 505.

The ME/AMT firmware (120a) exposes an IDE-R device/DVD to the platform/BIOS and changes the priority of boot devices to ensure that the IDE device is the primary boot device, in block 505. The platform follows the boot vector and starts to boot from the IDE device/DVD, in block 507. ATA commands from ISO DVD Driver are converted to IDE-R protocol messages by the block transfer part (129) of ME/AMT firmware (120a), in block 509.

Protocol messages are sent to the firmware emulator for IDE-R server (125), which then reads boot strap code (253) from the 3PDS, in block 511. Boot strap code refers to the master boot record (MBR) on the hard disk drive (260), but not necessarily at the legacy Sector 0 location, as discussed above. The ME/AMT firmware leverages an interface to the hard disk drive (202) to read sectors to boot the host, in block 513.

If the local IDE-R flag was not set, then the BIOS utilizes the usual boot target to boot the host processor, in block 517. This may be an actual boot from remote network location, hard drive, solid state drive, CD/DVD, or the like, depending on the BIOS setup parameters, network connectivity, and which drives in the boot setup priority order are actually bootable drives.

Figure 6:
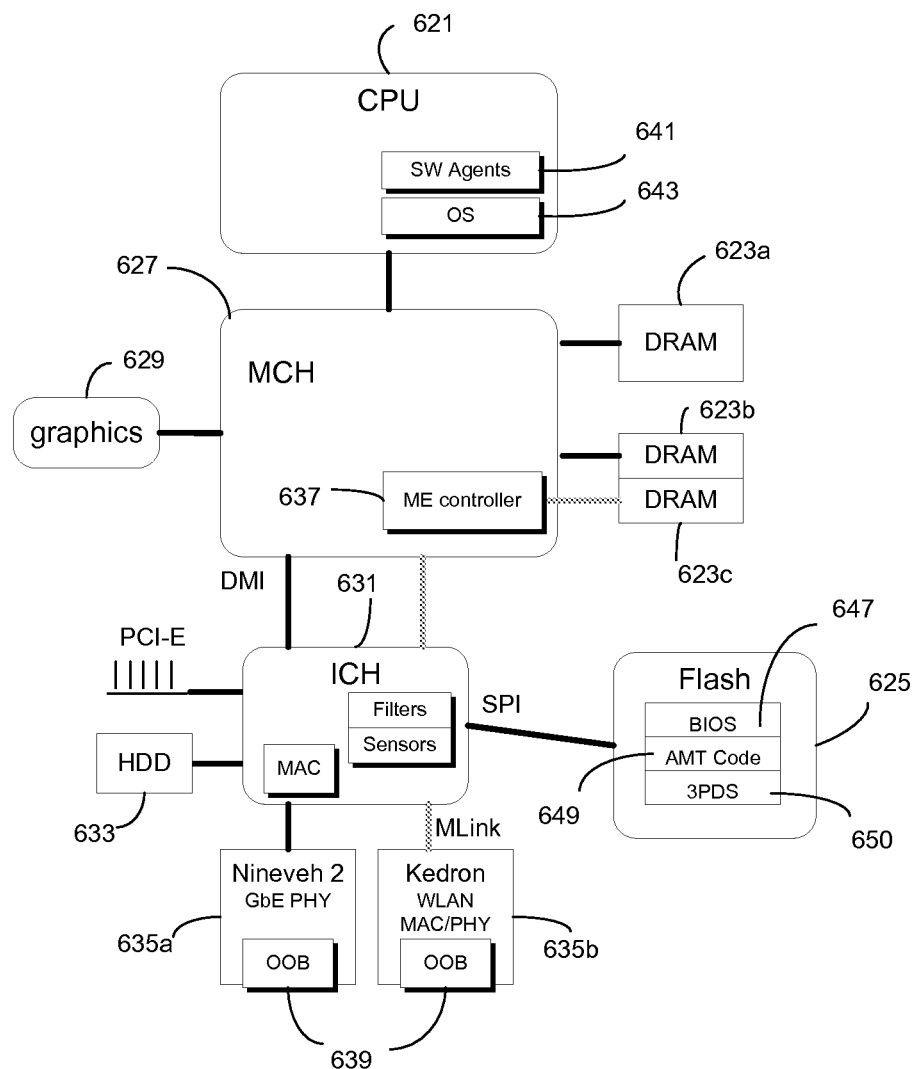
FIG. 6 is a block diagram illustrating an example client platform which may be utilized in implementation of various embodiments of the invention.

FIG. 6 is a block diagram illustrating an example client platform which may be utilized in implementation of various embodiments of the invention. It will be understood that these figures are used for illustration only, and embodiments of the invention may be implemented on a variety of platform architectures.

Referring now to FIG. 6, in an example client embodiment, the platform comprises a processor 621 having possible software agents 641 and an operating system 643. The processor 621 may be communicatively coupled to DRAM 623a-c via a memory controller hub (MCH), or north bridge 627. The MCH 627 may communicate to a graphics interface 629 and an ICH 631. The ICH 631 may communicate with a hard disk drive (HDD) 633, flash memory 625 and one or more network interface devices 635a-b, for instance the Ninevah 2 Ethernet controller or the Kedron wireless LAN adapter, both available from Intel Corp. It will be understood that a variety of architectures may be utilized, for instance, where the processor(s), memory and the memory controller(s) are integrated in the processor complex and the ICH is replaced with a platform controller hub (PCH, not shown).

The network devices 635a-b may have an out-of-band (OOB) communications component 639. In this embodiment, the ME subsystem 637 may be built into the MCH 627. In other embodiments, the ME may reside within the processor complex as an uncore, or another component of the platform, such as the PCH. Regardless of the where the ME resides on the platform, the ME may utilize the same DRAM that the host processor uses. Range registers may be set to keep the host processor from accessing memory regions used by the ME, and vice-a-versa. The flash memory 625 comprises the host firmware code (BIOS) 647, protected AMT code 649 and manufacturer settings.

Processor 621 may be any type of processor capable of executing software, such as a microprocessor, digital signal processor, microcontroller, or the like. Though FIG. 6 shows only one such processor 621, there may be one or more processors in platform hardware and one or more of the processors may include multiple threads, multiple cores, or the like.

An embodiment may utilize a manageability engine (ME) 637 to store and retrieve a boot image or boot strap code in a protected memory, for instance flash 625. The flash memory 625 may comprise a portion accessible to the host processor 621 for BIOS code 647, as well as a protected portion inaccessible to the host processor for AMT code 649. The flash memory 625 may also have a third party data store (3PDS) 650 accessible to the ME and AMT firmware. In an embodiment, these portions 649/650 are chipset protected and inaccessible to the host processor. In an embodiment, the 3PDS 650 resides in the same portion as the AMT code 649, and is controlled by the AMT firmware of the ME, where the host processor has no direct access to the portions 649 and 650.

The techniques described herein are not limited to any particular hardware or software configuration; they may find applicability in any computing, consumer electronics, or processing environment. The techniques may be implemented in hardware, software, or a combination of the two.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Each program may be implemented in a high level procedural or object-oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine accessible medium having stored thereon instructions that may be used to program a processing system or other electronic device to perform the methods.

Program code, or instructions, may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, consumer electronics devices (including DVD players, personal video recorders, personal video players, satellite receivers, stereo receivers, cable TV receivers), and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks or portions thereof may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A system for booting a host processor on a computing platform, the system comprising:
    a host processor on a computing platform coupled to a non-volatile memory residing on the computing platform and storing host firmware code; and
    a second processor on the computing platform coupled to an out-of-band communication interface, and also coupled to a protected portion of the non-volatile memory, the protected portion of non-volatile memory being inaccessible to the host processor; and manageability engine firmware executing on the second processor comprising:
    an emulator configured to emulate access protocols sent by the host firmware during host processor boot to transparently retrieve host processor boot information from the protected portion of the non-volatile memory, and
    wherein the emulator is further configured to locally emulate a remote IDE-Redirect server to communicate with a third-party data store (3PDS) flash memory to retrieve an international standard organization (ISO) boot image to serve as a local copy of the ISO boot image, wherein the emulator is further to read/write blocks from/to the local copy of the ISO boot image, wherein the host processor boot information includes the ISO boot image, and wherein the non-volatile memory includes the 3PDS flash memory.

2. The system as recited in claim 1, wherein the emulated access protocols are protocols for communication with an integrated development environment (IDE) storage device.

3. The system as recited in claim 1, wherein the emulator further comprises a block transfer logic unit.

4. The system as recited in claim 1, wherein the host processor boot information comprises boot strap code corresponding to the ISO boot image residing on a storage device coupled to the computing platform, wherein the ISO boot image resides in a sector other then sector 0 on the storage device, and wherein the second processor firmware further comprises an interface to the storage device.

5. The system as recited in claim 1, wherein the host processor is to access the protected portion of the non-volatile memory via the manageability engine firmware only during boot of the host processor.

6. A computer implemented method for booting a host processor resident on a computing platform, the computing platform also having a second processor executing manageability engine firmware, the method comprising:
    commencing boot of the host processor on the computing platform;
    determining whether the host processor is provisioned to boot from a local IDE storage device utilizing the manageability engine firmware;
    sending integrated development environment (IDE) access commands by the host processor to access the IDE storage device;
    intercepting the sent IDE access commands by the manageability engine firmware;
    emulating, via an emulator, the IDE access commands, by the manageability engine firmware, wherein the emulator configured to emulate access protocols sent by the host firmware during host processor boot to transparently retrieve host processor boot information from the protected portion of the non-volatile memory; and
    returning boot information from a protected third party data store coupled to the computing platform, by the manageability engine firmware, wherein the protected third party data store is not directly accessible by the host processor, and
    wherein the emulator is further configured to locally emulate a remote IDE-Redirect server to communicate with a third-party data store (3PDS) flash memory to retrieve an international standard organization (ISO) boot image to serve as a local copy of the ISO boot image, wherein the emulator is further to read/write blocks from/to the local copy of the ISO boot image, wherein the host processor boot information includes the ISO boot image, and wherein the non-volatile memory includes the 3PDS flash memory.

7. The method as recited in claim 6, further comprising: booting the host processor using the ISO image, wherein access to the ISO image by the host processor is via the manageability engine firmware.

8. The method as recited in claim 6, wherein the boot information comprises boot strap code corresponding to a master boot record (MBR) in a storage device.

9. The method as recited in claim 8, further comprising:
    booting the host processor from the MBR in the storage device, wherein access to the storage device by the host processor is via an interface between the manageability engine firmware and the storage device.

10. The method as recited in claim 8, wherein the MBR corresponds to a non-Sector 0 location on the storage device.

11. A non-transitory computer readable medium having instructions stored therein, the instructions when executed on a computing platform, cause the computing platform to:
 during boot of a host processor on the computing platform, determine whether the host processor is provisioned to boot from a local integrated development environment (IDE) storage device utilizing manageability engine firmware, the manageability engine firmware to execute on a second processor coupled to the computing platform;
 intercept IDE access commands sent by the host processor during boot to access the IDE storage device, by the manageability engine firmware;
 emulate, via an emulator, the IDE access commands by the manageability engine firmware, wherein the emulator configured to emulate access protocols sent by the host firmware during host processor boot to transparently retrieve host processor boot information from the protected portion of the non-volatile memory; and
 return boot information from a protected third party data store coupled to the computing platform, by the manageability engine firmware, wherein the protected third party data store is not directly accessible by the host processor, and wherein the emulator is further configured to locally emulate a remote IDE-Redirect server to communicate with a third-party data store (3PDS) flash memory to retrieve an international standard organization (ISO) boot image to serve as a local copy of the ISO boot image, wherein the emulator is further to read/write blocks from/to the local copy of the ISO boot image, wherein the host processor boot information includes the ISO boot image, and wherein the non-volatile memory includes the 3PDS flash memory.

12. The medium as recited in claim 11, further comprising instructions to:
 boot the host processor using the ISO image, wherein access to the ISO image by the host processor is via the manageability engine firmware.

13. The medium as recited in claim 11, wherein the boot information comprises boot strap code corresponding to a master boot record (MBR) in a storage device.

14. The medium as recited in claim 13, further comprising instructions to:
 boot the host processor from the MBR in the storage device, wherein access to the storage device by the host processor is via an interface between the manageability engine firmware and the storage device.

15. The medium as recited in claim 13, wherein the MBR corresponds to a non-Sector 0 location on the storage device.

* * * * *